KLAS E.G. HELLSTRÖM
INVENTOR

United States Patent Office 3,381,821
Patented May 7, 1968

3,381,821
PULP FILTER
Klas E. G. Hellström, Mount Royal, Quebec, Canada, assignor to Aktiebolaget Kamyr, Karlstad, Sweden
Filed Nov. 9, 1965, Ser. No. 507,001
Claims priority, application Sweden, Nov. 10, 1964, 13,514/64
2 Claims. (Cl. 210—116)

ABSTRACT OF THE DISCLOSURE

An improved cellulose pulp filter, which reduces the amount of entrained air discharged with the filtrate, is disclosed. The discharge conduit of a conventional cellulose pulp filter is connected to a closed tank, to which is attached a vent pipe, and a conduit for filtrate recirculation. Control means maintain a desired, predetermined filtrate level in filtrate collection means in the filter.

---

This invention relates to an improvement in cellulose pulp filters. More specifically, this invention relates to an improved cellulose pulp filter wherein a minimum of entrained air is discharged with the filtrate, thereby reducing foaming problems.

A filter which is commonly used in the art comprises a vat for holding a pulp suspension and a rotary sieve drum, partly submerged therein and having cells extending axially along its inner side. These cells communicate with a stationary filtrate collecting means which is held under vacuum and to which a filtrate discharge conduit is connected. The filtrate flowing out of the cells has a tendency to carry air with it down into the discharge conduit. Generally, part of the filtrate is recirculated to the pulp vat of the filter. The entrained air can produce serious foaming problems, especially if it is recirculated, and can reduce the capacity of the filter.

It is an object of this invention to provide an improvement in the above-described cellulose filter in order to reduce the amount of entrained air in the filtrate of a cellulose pulp filter. It is an additional object of this invention to reduce the amount of foaming caused by recirculated filtrate in a cellulose pulp filter. It is a further object of this invention to provide a device for maintaining a constant level of filtrate in filtrate collection means of a cellulose pulp filter. Still further objects in the entire scope of applicability of the present invention will become apparent from the detailed description given hereinafter; however, it should be noted that the detailed description is given by way of illustration and not of limitation.

Briefly, the present invention involves the addition to the filter of a device or apparatus which maintains a desired filtrate level, substantially constant and independent of vacuum variations, in the stationary filtrate collection means. As a result of maintaining a relatively high filtrate level, air can separate out of the filtrate contained in the filtrate collecting means. The filtrate of the apparatus of this invention has much less entrained air than the filtrate of previously used filters, in which the filtrate generally dropped freely a considerable distance from the drum cells down into the usually quite narrow discharge conduit, especially if the vacuum should vary for some reason or other.

The invention will be more readily understood from references to the accompanying drawings, in which.

Figure 1:
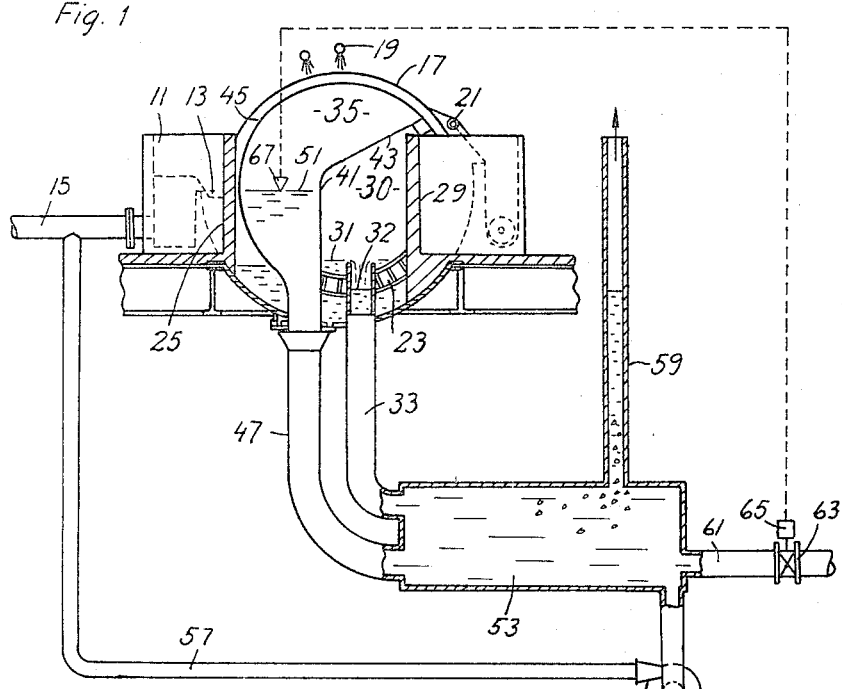
FIGURE 1 is a partial cross-section of the cellulose filter of this invention, where the cross-section is perpendicular to the axis of the rotary sieve drum.
Figure 2:
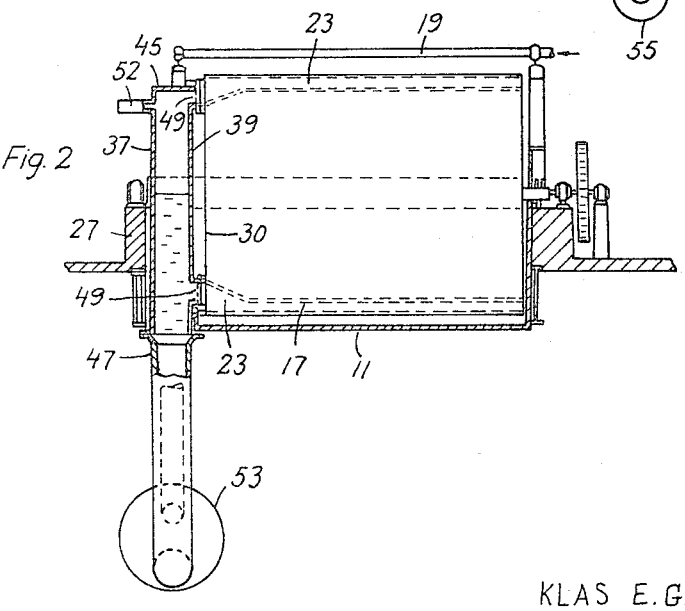
FIGURE 2 is a partial cross-section of the cellulose filter of this invention, where the cross-section is parallel to the axis of the rotary sieve drum.

More specifically, in FIGURE 1, a vat 11 is filled to a certain level 13 with a cellulosic pulp suspension supplied through conduit 15. A rotary horizontal sieve drum 17 is placed inside of the vat with its lower portion submerged in the pulp suspension. As the sieve drum 17 rotates, a pulp layer is deposited on the lower, upwardly moving part of the drum. As the pulp layer is carried by the drum above the pulp level 13, the pulp is dewatered and air is then sucked through the filter drum. The pulp layer is then washed by means of water supplied through spray tubes 19, and is finally removed from the surface of the sieve drum by means of pickup roll 21. Along the inner side of the cylindrical sieve of the drum are located axially extending cells 23. These conventional cells are closed at one end and along the entire length, and the other ends form orifices through which passes the filtrate that has been sucked through the sieve face of the drum. The vat 11 has an end part, located on the orifice end of the drum, formed by the walls 25, 27, 29 and which together with the closed end wall 30 of the sieve drum 17 forms an open chamber for the collection of the filtrate. The end wall 30 of the sieve drum is sealed against an inner transverse end wall of the vat so that pulp cannot flow directly from the main part of the vat into the described filtrate collection open chamber. Filtrate passing through the cells 23 fills this open chamber to a level 31, which is lower than the level 13 of pulp suspension in the vat 11, and this filtrate is discharged through conduit 33. The cells 23 communicate with the open filtrate collection chamber, which is open to the atmosphere, only during that portion of the rotation of the drum when the cells are travelling in a downwardly direction.

Located within this open filtrate collection chamber is a closed stationary filtrate collecting means and suction head 35 which is suitably designed for maintaining a vacuum within it. This suction head 35 is essentially shaped as a hollow sector of a cylinder and is composed of a flat outer wall 37, a parallel inner wall 39 and side walls at right angles thereto. The side walls consist of flat radially extending walls 41 and 43, forming an angle of approximately 135° to each other, and a wall 45 forming a sector of a cylindrical shell. A discharge conduit 47 is connected to the lower part of and in communication with the interior of the suction head 35. An arc-shaped opening 49 in the inner wall 39 is situated opposite of and sealed to the orifices of those cells 23 which do not open into the open filtrate collection chamber. Filtrate and air flow into the suction head 35 from the cells 23. Free liquid level 51 is formed in the suction head, and the filtrate is discharged through conduit 47. The rotary action of the sieve drum, with the consequent flow of filtrate into cells 23 during the period when said cells are submerged, and the flow of the filtrate out of the cells 23 into suction head 35 as the cells rise above liquid level 51, pumps air out and produces a vacuum in suction head 35. If desired, this vacuum may be increased by connecting the interior of the suction head via conduit 52 to a vacuum pump.

Filtrate discharge conduits 33 and 47 are connected to a seal tank 53, preferably situated below the filter, and completely filled with filtrate under a positive static pressure. Filtrate is recirculated from the seal tank by means of pump 55 and conduit 57 to the filter vat 11 in order to dilute the pulp supplied through conduit 15 to a low consistency, suitable for proper operation of the filter. Entrained air in the filtrate passing through conduit 47 will have sufficient residence time in tank 53 to disentrain from the filtrate and be discharged through vent pipe 59, the lower part of which is connected to the upper part of seal tank 53 and the upper part of which is open to the atmosphere. Conduit 61 discharges that portion of the filtrate which is not recirculated from the system, for example, to a drain. The conduit 61 is illustrated as connected to the lower part of tank 53 but may optionally be connected instead to filtrate conduits 33 and 47, filtrate recirculation conduit 57 or even vent pipe 59.

A choke valve 63, operated by a servo motor 65, is inserted in conduit 61. The servo motor 65 is controlled by a level feeling or detection means 67 located in suction head 35, for example, by means of electrical impulses. The level feeling or detection means 67 may comprise any of the conventional liquid level detectors commonly used in the art, for example, such as those disclosed in Perry, Chemical Engineers' Handbook, third edition, 1950, McGraw-Hill, New York, pages 1289 to 1291, suitably connected to a control means for controlling servo motor 65. The level control means 67 reacts to the changes of the liquid level 51 in suction head 35 in such a manner that if the level rises, the detection means 67 sends an impulse to servo motor 65 to further open the valve 63, and if the level 51 drops, the level control means 67 will transmit an impulse whereby the valve 63 further restricts the flow in conduit 61. Therefore, an increased vacuum will be counteracted by a drop of the pressure in tank 53 whereas when the vacuum decreases the pressure in the tank 53 is raised by restricting the flow of filtrate through the valve 63. Thus, the liquid level 51 will oscillate with insignificant variations about the position determined by the setting of the level detection and control means 67. In other words, the filtrate level in the suction head will be maintained at a substantially constant level and will not be dependent upon the variations occurring during the operations of the filter.

Preferably, the level detection and control means 67 is vertically adjustable so that it is possible to control the liquid level 51 at any desired level, for example, when other process variable change. Usually, the liquid level 51 will be maintained at approximately the same height as the pulp suspension level 13 in the vat 11 but it is sometimes preferable to control the liquid level 51 at a different height, particularly a lower height. In any case, the liquid level 51 will be a considerable distance above the point of connection of the suction head 35 to the discharge conduit 47. The area of the liquid surface at the liquid level 51 will comparatively be quite great when compared to the cross-sectional area of the discharge conduit 47. Consequently, the velocity of the filtrate is comparatively low in the region of the liquid surface 51, thus allowing entrained air bubbles to rise to the surface in a direction counter-current to the flow of the filtrate therefrom by relieving the filtrate of at least part of its entrained air content. As can be seen from an examination of FIGURE 1, for a considerable portion of the total height of the drum 17, an increase in the height of the liquid level 51 will increase the surface area of the liquid within the suction head 35. A high height of the liquid level 51 is also advantageous in that the filtrate flowing out of the cells 23 will have a shorter drop to the surface and therefore a reduced tendency to form foam when hitting the liquid level 51.

The open end of tube 33 forms an overflow for filtrate contained in the open filtrate collection chamber, thereby maintaining filtrate level 31 essentially constant. A liquid level 32 is formed within the tube 33 somewhat below the upper end of the tube. The position of the liquid level 32 varies with the pressure in the tank 53. If the surface 32 is too low, air will be entrained by the action of the filtrate dropping down into the tube 33. In some instances, it may be advantageous to insert a choke valve in the conduit 33. This choke valve can be controlled by level detection and controlling means similar to that controlling valve 63 but instead senses the liquid level 32, to maintain the liquid level 32 at a desired height, which, in some instances, may coincide with the filtrate level 31.

The level control device of this invention has a decided advantage in that there is no need for choking or restricting the flow in the conduit 47. Such a choking would reduce the size of air bubbles entrained by the filtrate at that point, dispersing the air more finely in the filtrate and thus making the separation of entrained air in tank 53 more difficult.

Since the tank 53 is closed, except for vent pipe 59, it may be located in any desired position. Usually the tank is located considerably lower than the filtrate, as illustrated by the drawings. The static pressure in the tank counterbalances the increased vertical height of the conduit 57 so that the work output required by pump 55 to recirculate the filtrate is not increased. The tank 53 may be alternatively placed at approximately the same level as the filter, in which case the tank 53 is preferably held under vacuum, generally by connecting vent pipe 59 to a vacuum pump or to the upper part of the suction head 35.

While a particular filter has been illustrated, this invention may be applied to a wide variety of filters. In filters of the type where filtrate leaves a cylindrical filter drum at both ends, conduits 47 and 33 may be duplicated to conduct the filtrate from both ends of the drum to a common seal tank 53.

It is evident that the invention may be applied to filters of types deviating considerably from the shown. The above described embodiment of the level control device of this invention is merely an example, the details of which may be modified without departing from the scope of the invention as set forth in the following claims.

I claim:

1. In a cellulose pulp filter comprising a vat for containing a pulp suspension a rotary sieve drum at least partly inside of said vat whereby said drum may be partly submerged in said pulp suspension, and means for removing pulp from said drum, said drum having cells extending axially along its inner side and communicating with stationary collection means for filtrate collecting, said stationary collection means being closed for maintaining a vacuum therein and connected to a filtrate discharge conduit, the improvement comprising a closed tank connected to said discharge conduit, and a vent pipe attached to said closed tank, whereby entrained air can be discharged, and a conduit, through which filtrate is recirculated to said vat, attached to said closed tank, control means for maintaining a desired filtrate level in said stationary collection means substantially constant and independent of vacuum variations therein, whereby entrained air may be separated from the collected filtrate.

2. In a cellulose pulp filter comprising a vat for containing a pulp suspension, a rotary sieve drum at least partly inside of said vat whereby said drum may be partly submerged in said pulp suspension, and means for removing pulp from said drum, said drum having cells extending axially along its inner side and communicating with stationary collection means for filtrate collecting, said stationary collection means connected to a vacuum source and to a filtrate discharge conduit, the improvement comprising a closed tank connected to said discharged conduit, a vent pipe attached to said closed tank, whereby entrained air can be discharged, and a conduit, through which filtrate is recirculated to said vat, attached to said closed tank, and control means for maintaining a desired filtrate level in said stationary collection means substantially constant and independent of vacuum variations therein, whereby entrained air may be separated from the collected filtrate.

References Cited

UNITED STATES PATENTS

| | | | |
|---|---|---|---|
| 2,505,513 | 4/1950 | Young et al. | 210—123 X |
| 2,540,301 | 2/1951 | Staege | 162—330 X |
| 2,765,085 | 10/1956 | Strindlun | 210—402 X |
| 2,999,785 | 9/1961 | Richter et al. | 210—402 X |
| 3,014,589 | 12/1961 | Frykhult | 210—123 |

FOREIGN PATENTS

| | | |
|---|---|---|
| 553,283 | 2/1958 | Canada. |
| 641,090 | 5/1962 | Canada. |

REUBEN FRIEDMAN, *Primary Examiner.*

D. M. RIESS, J. ADEE, *Assistant Examiners.*